Figure 1:
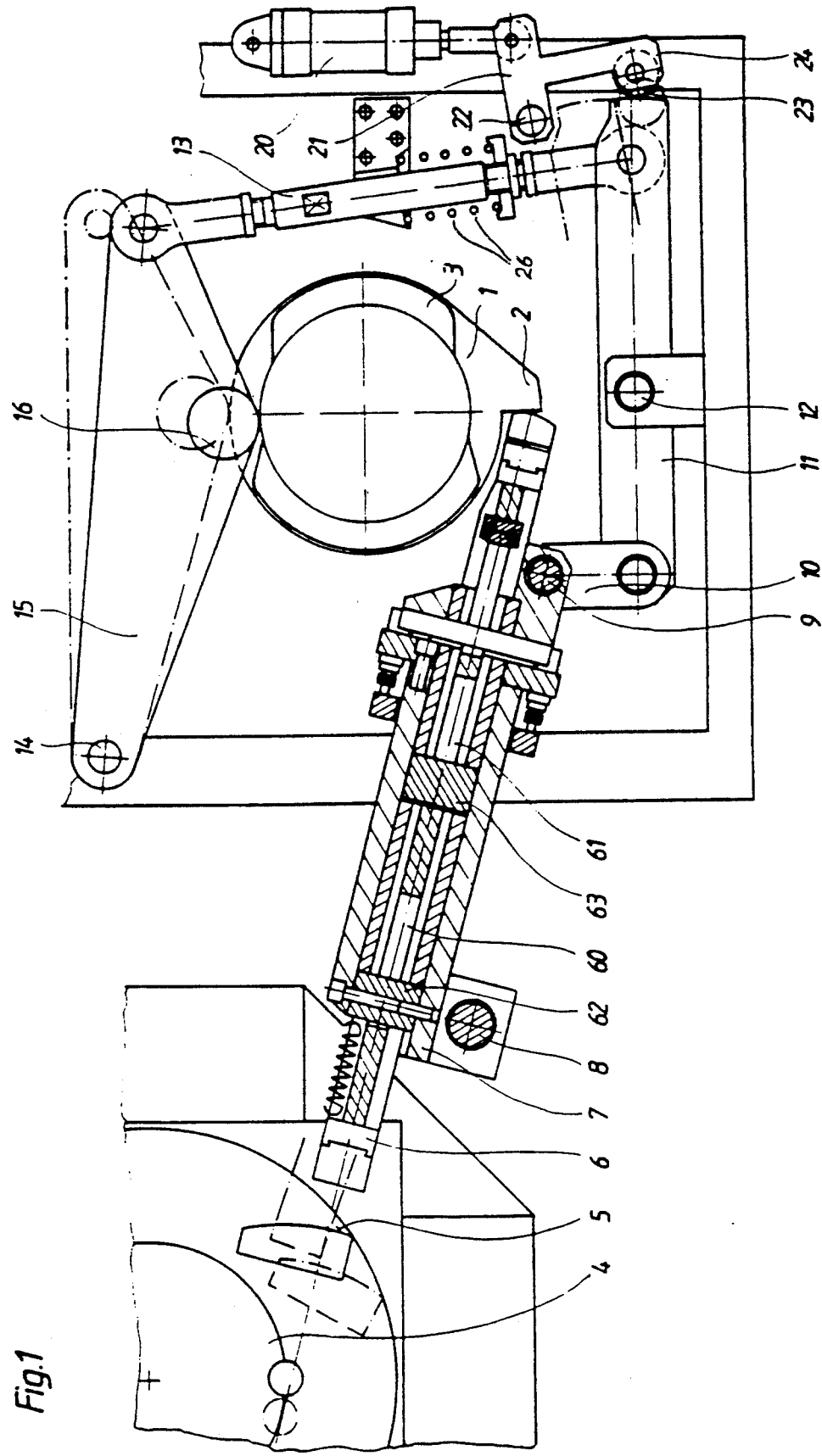

United States Patent [19]

Balint

[11] Patent Number: 5,305,672
[45] Date of Patent: Apr. 26, 1994

[54] DRIVING MEANS

[76] Inventor: Ludwig Balint, Bregenzer Strasse 37, A-6911 Lochau/Österreich, Austria

[21] Appl. No.: 718,017

[22] Filed: Jun. 20, 1991

[51] Int. Cl.⁵ .......................... B23D 21/00; B26D 3/16
[52] U.S. Cl. ........................................ 83/179; 83/187; 83/199; 173/93.007; 173/109; 173/110; 173/124; 173/205
[58] Field of Search ................ 83/646, 200, 199, 196, 83/187, 186, 184, 179, 178, 67, 66, 63, 198; 173/48, 93.7, 109, 110, 124, 205

[56] References Cited

U.S. PATENT DOCUMENTS

| | | | |
|---|---|---|---|
| 2,412,930 | 12/1946 | Walklet | 83/184 X |
| 4,470,330 | 9/1984 | Lindell | 83/179 X |
| 4,529,044 | 7/1985 | Klueber et al. | 173/48 |
| 4,635,514 | 1/1987 | Borzym | 83/196 |
| 4,744,277 | 5/1988 | Balint | 83/186 X |

FOREIGN PATENT DOCUMENTS 7308911 12/1974 Netherlands ............................ 83/179

Primary Examiner—Hien H. Phan
Assistant Examiner—Clark F. Dexter
Attorney, Agent, or Firm—Collard & Roe

[57] ABSTRACT

Driving means in particular for a cutting-off device with a rotationally held cutting-off tool. In order to provide the cutting-off tool with high acceleration in a simple manner, a sledge hammer (6) is provided that cooperates with an impact surface (5) arranged on a rotationally held cutting-off tool (4). Furthermore, a cam (2) is arranged on at least one driven rotating inertial body (1) for acting upon said sledge hammer, whereby said inertial body (1) is driven at an essentially constant, optionally adjustable speed.

2 Claims, 3 Drawing Sheets

DRIVING MEANS

The invention relates to a driving means, in particular for a cutting-off device with a rotationally held cutting-off tool.

Such cutting-off tools are used, for example, for cutting off rods or pipes. The drive of said tools is usually provided in such a way that they are temporarily coupled with a driving means via a clutch.

This results in the disadvantage of high wear and tear in the clutch, and, in addition, the tool is provided with little acceleration due to the gradual engagement of the clutch, whereby this causes large amounts of energy to be used up during the cutting-off process, particularly where tough materials are concerned. In addition, this method has an adverse effect on the quality of the surfaces of cut.

It is the object of the present invention to avoid such disadvantages and to propose a driving means of the type mentioned above, said means being characterized by its simple arrangement enabling high initial acceleration of the cutting-off tool at the beginning of its cutting motion.

In accordance with the invention this is achieved by provided a sledge hammer that cooperates with an impact surface, said surface extending radially from the rotational axis of the rotationally held cutting-off tool, and that a cam acts upon the sledge hammer and may be brought into contact with the front surface of said sledge hammer, said cam being arranged on an inertial mass rotating in a circular path, whereby said inertial mass is driven at an essentially constant, optionally adjustable speed.

In this way it is possible to give the cutting-off tool a very strong momentum that accelerates it accordingly and thus instantaneously places a load on the workpiece to be cut off, thus facilitating the cutting-off process. The wear and tear to the sledge hammer and the impact surface cooperating with said sledge hammer can be kept within tolerable limits if suitable materials are selected and treated accordingly, for example by surface hardening and similar methods.

In accordance with a further feature of the invention it may be provided that the distance between the hammer head of the sledge hammer in the rest or retracted position closest to the cam and the impact surface of the tool in the locked position is longer than the geometrical development of the section of the cam's path in which said cam is in contact with the sledge hammer.

This measure ensures that the sledge hammer hits the impact surface of the cutting-off tool practically in free flight and transfers its energy to said surface. Furthermore, this also prevents the cam from acting directly upon the tool via the sledge hammer and thus crushing the sledge hammer.

In accordance with a preferred embodiment of the invention it is provided that the sledge hammer is held axially displaceable in a guiding means, said guiding means being rotationally held about an axis and being coupled with a control means that moves the sledge hammer into and out of the cam's path of movement.

This safeguards that the cam acts upon the sledge hammer satisfactorily and, in addition, this allows bringing the sledge hammer in line with the cam's path of movement only when certain requirements are met, such as the respective position of the tool and its availability for the next step in the process.

In order to safeguard good guidance of the sledge hammer and thus the precisely defined point of impact of said hammer on the impact surface of the tool, thus resulting in precisely reproducable conditions for said tool, it may be further provided that in the end of the guide mean remote from the inertial mass that is provided with the cam(s), said guide means is held swivellable and that at its other end said guide means is connected via a guide rod with a lever controlled by a link connected to the inertial body.

It may be further provided that a locking means acts upon the lever of the control means of the sledge hammer's guide means, said locking means being controlled by a sensing means for sensing the proper release of said locking means that holds the rotational tool driven by the sledge hammer in its rest position and that holds the lever in such a way that the sledge hammer is placed outside of the cam's path of movement as long as the tool has not been released by its locking means.

In this manner it is ensured that the sledge hammer can only come in line with the cam's path of movement if the tool is located in a rest position and released to said position by the locking means. This prevents, in a simple and efficient way, damage to the tool or the locking means in the event of abnormal conditions, e.g. the late release of the tool by the locking means.

Figure 2:
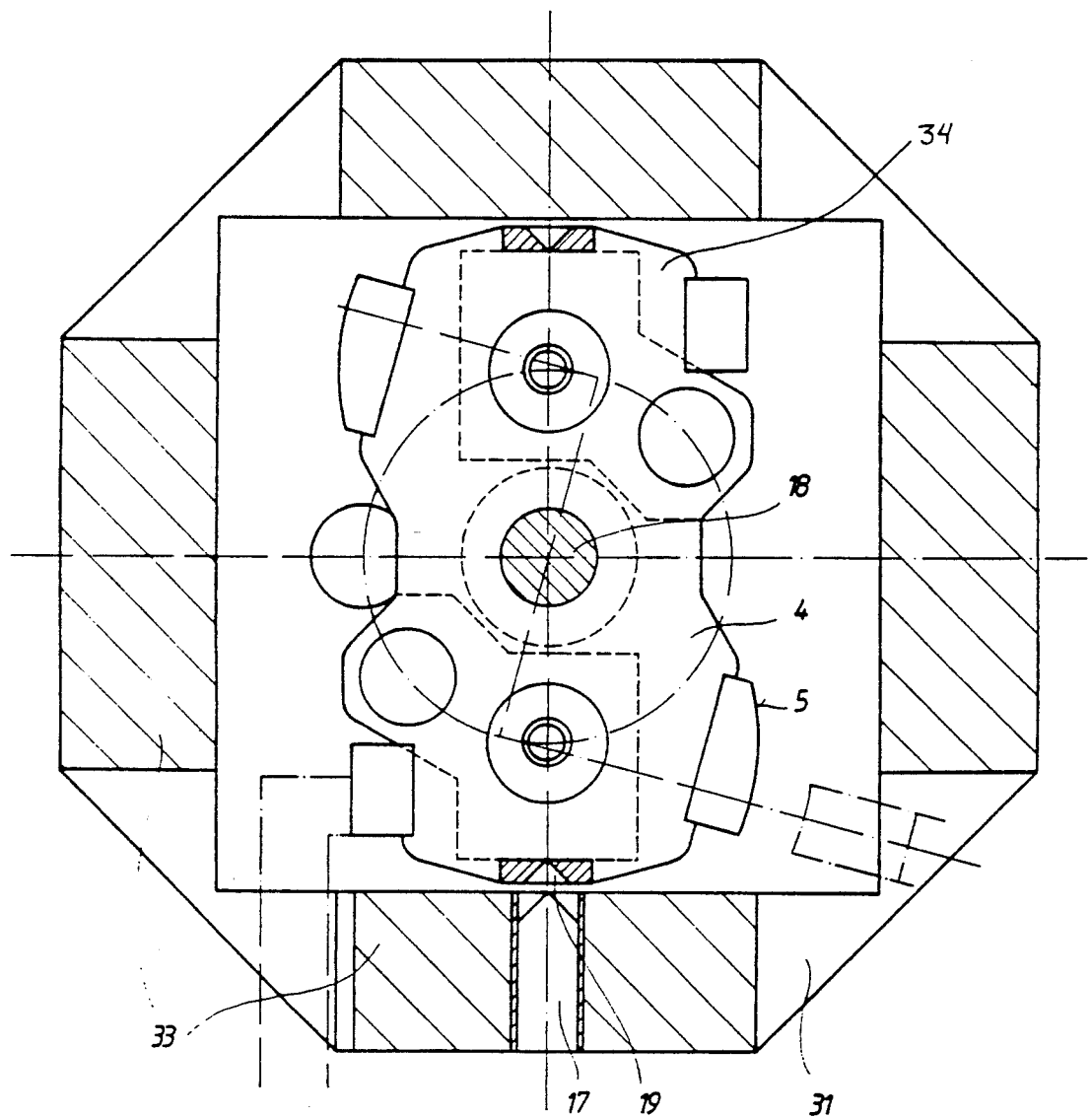

The invention is now explained in greater detail by reference to the enclosed drawing, in which:

FIG. 1 schematically shows the driving means in accordance with the invention;

FIG. 2 schematically shows the tool; and

Figure 3:
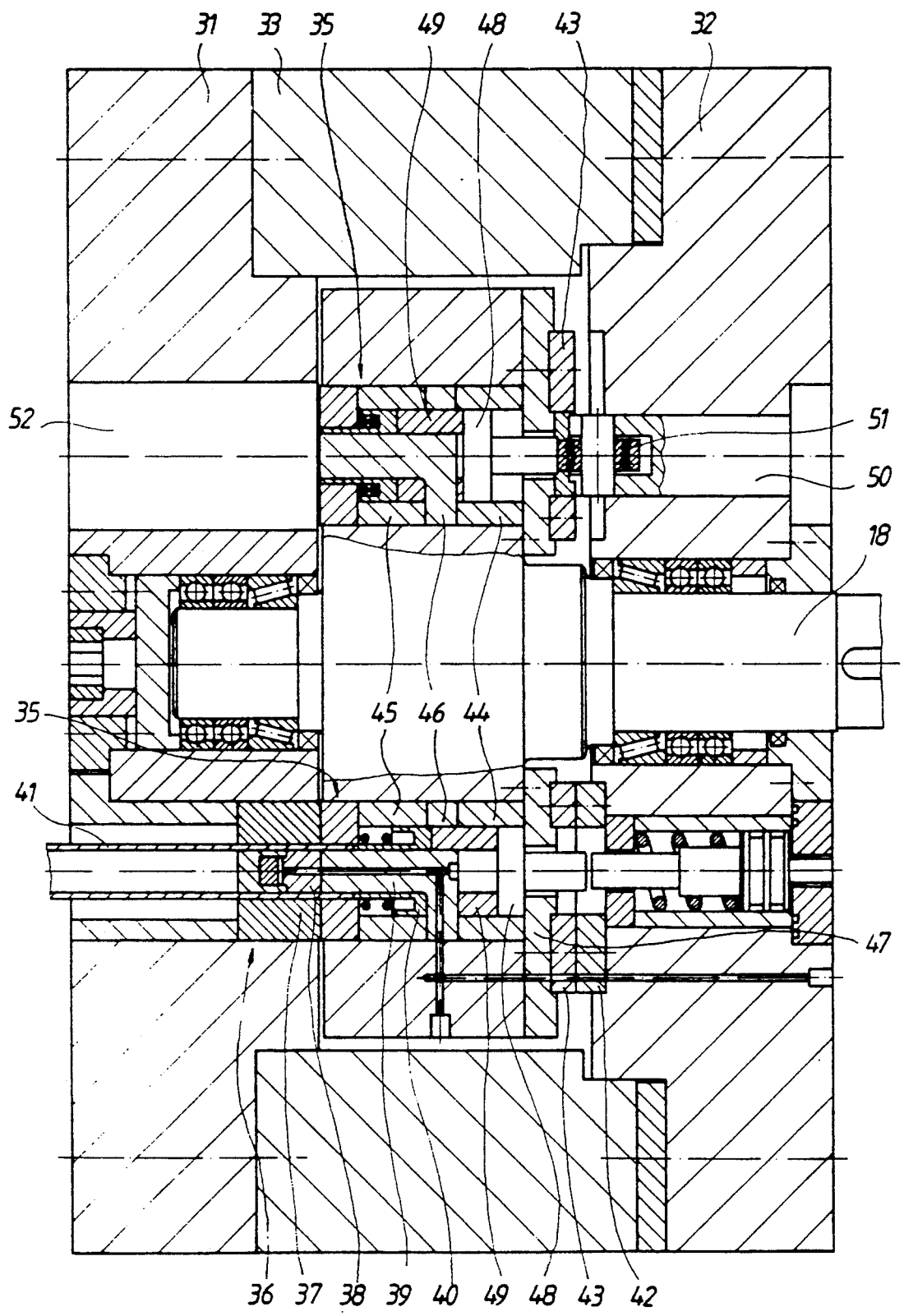

FIG. 3 shows a section through the tool.

The inertial body 1 rotated by a drive not shown herein is provided with two cams 2 (for sake of clarity only one of them is shown). Furthermore, said inertial body 1 is torsionally rigidly connected to a link 3 and turns clockwise in FIG. 1 with an essentially constant, but adjustable speed.

The tool 4, schematically outlined in FIG. 1, is torsionally rigidly held on a rotationally held shaft and is provided with an impact surface 5.

Between the inertial body 1 and the tool 4 a sledge hammer 6 is arranged, said hammer being guided by a guide means 7.

Said guide means 7 is swivellably held about an axle 8 fixedly attached to the frame, whereby said guide means 7 is penetrated by said axle 8 in its end section located towards the tool 4. The end of guide means located towards the inertial body 1 is connected to a guide rod 10 via an axle 9, and said guide rod 10 is connected to a lever 11 that is swivellably held to an axle 12 fixedly attached to the frame.

A spring-mounted rod 13 is pivoted on the second arm of lever 11, said rod being pivotally connected to an arm 15 swivelling about axle 14 rigidly attached to the frame, said arm carrying a roller 16 running on link 3. Here, the arm 15 is prestressed against link 3 by a spring 25 or a cylinder-piston arrangement driven by a pressure medium, so that the roller 16 is kept in continuous contact with the rotating link 3.

In accordance with the position of the individual components as outlined in FIG. 1, roller 16 is sunk into a recess of link 3 and thus presses down lever 11 via rod 13 with spring 26, so that the sledge hammer 6 has been swivelled into the path of movement of cam 2. While the inertial body 1 rotates at a constant speed, cam 2 hits against sledge hammer 6 and transmits a respective momentum to said hammer, thus causing the sledge hammer 6 to accelerate and fly towards the tool 4 against its impact surface 5.

The locking means for the tool includes a pin 17 having a conical tip and is held axially displaceable in a sleeve of the tool. Pin 17 is controlled in accordance with the position of the rotationally held part 34 of the tool and the cam 2. Pin 17 is moved into part 34, when the tool has reached a position shown in FIG. 2 and pin 17 is moved out of tool 4, when cam 2 has reached a preset position. At that very moment, at which the sledge hammer 6 flies towards tool 4, the locking means of tool 4 has already released tool 4. At this stage the workpiece to be cut off has already been inserted into the tool and properly positioned.

As soon as sledge hammer 6 hits the impact surface 5 of tool 4, whereby the sledge hammer hits impact surface 5 in free flight due to the fact that the distance between the impact surface 5 and the hammer head 6' of sledge hammer 6 facing towards said surface is longer than the section of the path of cam 2 in which said cam stays in contact with the sledge hammer, said hammer passes its energy on to the tool and accelerates said tool, thus leading to the cutting off of the workpiece held in tool 4. The workpiece will be outlined in closer detail hereinafter by reference to FIG. 3.

A braking motor not shown in arranged on shaft 18 of tool 4, whose braking power is controlled by a control means not shown here, said control means registering and evaluating the tool's number of rotations, and brakes the tool in such a way that is comes to a standstill after a turn of about 180°. In this position pin 17 is moved forward to engage into the respective recess 19 of tool 4, thus giving it its precise position and allowing the insertion of the workpiece to be cut off into the tool.

In the meantime inertial body 1 and, in cooperation therewith, link 3 have continued to turn, thus making roller 16 run onto the elevated section of said link an bringing lever 11 into the position as indicated by the broken line. In this way the sledge hammer is brought out of the path of movement of cam 2.

Upon engagement of the locking means 17 into tool 4, the locking of lever 11 is activated. Said locking means essentially consists of the electromagnet 20 prestressed by a spring in the locked position. Electromagnet 20 acts upon a T-shaped lever 21 swivellably held on an axle 22 in one end section of its traverse beam, said axle 22 being fixedly attached to the frame, and carries in the free end section of its longitudinal bridge of roller 23 on a lateral ear 24. Electromagnet 20 and T-shaped lever 21 are shown in solid line in the unlocked position.

As soon as the locking means 17 engages with the recess 19 of tool 4, said locking means causes de-energization of electromagnet 20 and causes the T-shaped lever 21 to be swivelled clockwise. As roller 16 rests on the elevated section of link 3 at that very moment, lever 11 is swivelled into the position outlined by the broken line, so that the sledge hammer 6 is swivelled out of the path of movement of cam 2 and the roller 23 engages with the lever 11 from below. Thus lever 11 is locked in a position in which sledge hammer 6 is swivelled out from the path of movement of cam 2.

Only when the workpiece to be cut off is properly inserted in the tool and its locking means 17 has reached the release position again is the electromagnet 20 energized again and takes up the position as outlined in FIG. 1, thus enabling lever 11 to take up the position as outlined in unbroken lines as soon as roller 16 sinks into the recess in link 3.

As can be seen in FIGS. 2 and 3, tool 4 essentially consists of a casing with two plates 31, 32 and four bridge sections 33 connecting said two plates, whereby a rotatable part 34 is held in said casing. Between said bridge sections 33 there are free spaces in the circumferential direction, whereby the sledge hammer 6, indicated in FIG. 2 by the broken line, engages in one of said free spaces.

Shaft 18 is held in the two plates 31, 32, and on said shaft the rotatable part 34 of tool 4 is rotationally held.

In the rest position of the rotatable part 34 one of the cutting-off devices 35 is in alignment with one of the cutting-off devices 36 held in plate 31.

Said cutting-off devices essentially consist of a circular blade 37 into which the pipe 41 to be cut may be tightly placed in a press fit and a divided mandrel 38, 39 onto which the pipe to be cut may be pressed in a press fit. The plane of division of mandrel 38, 39 lies precisely in the plane of contact of the front faces of circular blade 37. Furthermore, a spring-loaded discharger 40 is provided that engages in the circular gap between the cutting off device 35 of the rotatable part 34 and the mandrel 39 of said device, whereby said discharger simultaneously serves as a stop for the pipe 41 to be cut off.

In the area of the cutting-off device 36 a support ring 42 is arranged on plate 32. One of the two counter rings 43 arranged on the rotatable part 34 rests on said support ring, thus facilitating the transmission of forces onto disk 32 that are required for pressing in the pipe 41 into the cutting-off devices 35, 36.

The mandrels 39 are supported by sleeves 44, 45, said sleeves being placed in the respective bores of part 34, and a flange 46 on a support ring connected with the part 34, whereby said flange is formed on each mandrel 39 and provided with openings.

Journals 49 provided on a tappet 48 engage in the openings of the flanges of mandrels 39. Said tappet 48 is controlled by a pushing journal 50 arranged in the area of the upper locking position of the rotatable part 34 in disk 32, said pushing journal holding in the area of its one end a ball bearing 51 by means of an axle penetrating a lateral bore.

When part 34 is turned by 180°, the free end of tappet 48 comes into contact with the outer ring of ball bearing 51 and is pressed in the direction of disk 31 by said outer ring. In this way the journals 49 of tappet 48 come to rest on the discharger 40 and press said discharger towards disk 31, so that the pipe section cut off is pressed out of the circular blade 37 and into the bore 52 of disk 31, from where it can be easily removed.

The guide means 7 more or less completely encompasses the cross section of sledge hammer 6. In addition, sledge hammer 6 comprises openings 60, 61 that are penetrated by the guide bodies 62, 63.

I claim:

1. A driving means for a cutting-off device with a rotationally-held cutting-off tool, comprising:
    a sledge hammer having a first end aligned with an impact surface for hitting the impact surface, said impact surface arranged on the rotationally-held cutting-off tool;
    at least one driven rotating body, a cam located on said at least one driven rotating inertial body defining a path of movement about said rotating inertial body for striking a second end of said sledge hammer, said at least one driven rotating inertial body being rotated at an essentially constant speed; and guide means, with a fixed axle, for holding said sledge hammer, and control means for controlling said guide means, wherein said sledge hammer is held axially displaceable in said guide means, said guide means being pivotally supported by said fixed axle and being pivoted by said control means to move said second end of said sledge hammer into the path of movement of said cam so that said cam axially drives said sledge hammer into said impact surface, and out of said path of movement after said sledge hammer has been driven.

2. A driving means for a cutting-off device with a rotationally held cutting-off tool, comprising:

a sledge hammer having a first end aligned with an impact surface for hitting the impact surface, said impact surface arranged on the rotationally-held cutting-off tool;

at least one driven rotating inertial body and a cam located on said at least one driven rotating inertial body defining a path of movement about said rotating inertial body for striking a second end of said sledge hammer, said at least one driven rotating inertial body being rotated at an essentially constant speed; and a rotating link fixedly attached to said at least one driven rotating inertial body for rotation therewith; and guide means for slidably supporting said sledge hammer, said guide means having two ends with a first end located remotely from said at least one driven rotating inertial body and a second end located adjacent said rotating inertial body, said guide means being swivellably supported by a fixed axle and additionally being connected at the second end via a guide rod to a lever, wherein said lever is pivoted by a control means for translating movement from said rotating link, via said lever and guide rod, to said guide means for moving said second end of said sledge hammer into and out of the path of movement of said cam such that when said second end of said sledge hammer is positioned in the path of movement of said cam, said cam drives said sledge hammer against said impact surface of said rotationally-held cutting off tool.

* * * * *